United States Patent [19]

Sollich

[11] Patent Number: 4,468,186

[45] Date of Patent: Aug. 28, 1984

[54] APPARATUS FOR FORMING STRANDS FROM MOLDABLE CONFECTIONARY SUBSTANCE

[75] Inventor: Helmut Sollich, Kalletal-Talle, Fed. Rep. of Germany

[73] Assignee: Sollich KG, Spezialmaschinenfabrik, Bad Salzuflen, Fed. Rep. of Germany

[21] Appl. No.: 365,650

[22] Filed: Apr. 5, 1982

Related U.S. Application Data

[63] Continuation of Ser. No. 146,765, May 5, 1980, abandoned.

[51] Int. Cl.³ .............................................. A01J 25/12
[52] U.S. Cl. .................................................... 425/294
[58] Field of Search ......................................... 425/294

[56] References Cited

U.S. PATENT DOCUMENTS 1,206,069  11/1916  Werner ................................ 425/294
2,923,259   2/1960  Malnati ............................... 425/294
3,994,215  11/1976  Rabeler ............................... 425/294

Primary Examiner—James R. Hall
Attorney, Agent, or Firm—Max Fogiel

[57] ABSTRACT

An apparatus for forming strands from moldable confectionary substance has two cooperating nip rollers which are each provided in their circumferential surfaces with axially alternating circumferentially complete grooves and ridges, the ridges of each roller entering into and sealing the grooves of the other roller. A device is provided for supplying a ribbon of moldable confectionary substance to the nip between the rollers so as to be formed into strands in their respective grooves.

15 Claims, 5 Drawing Figures

APPARATUS FOR FORMING STRANDS FROM MOLDABLE CONFECTIONARY SUBSTANCE

This is a continuation of application Ser. No. 146,765 filed May 5, 1980 and now abandoned.

BACKGROUND OF THE INVENTION

The present invention relates to apparatus for the forming of strands from moldable confectionary substance.

More particularly, the invention relates to an apparatus for forming strands from moldable confectionary substance such as, for example, chocolate or nougat mass, caramel, corcant, hard sugar or the like, or mixtures of such masses with nuts, almonds and other materials.

Such masses are frequently shaped into individual pieces of bar-shaped configuration, rectangular configuration or of quadratic configuration. To accomplish this it was heretofore necessary to pour the confectionary substance in flowable form into a set of molds, and to let it harden therein prior to unmolding. Self-evidently, this is time consuming and therefore expensive; in addition, the type and shape of final article that could be produced was always strictly dependent upon the available molds.

It is, however, also known from the prior art to form strands of such substances by passing these substances through an extruder, conical roller sets, strand presses or the like; these strands were subsequently subdivided into individual pieces. Here, also, the confectionary substances were cooled in batches and only thereafter converted to strands which could be later subdivided. Again, this is time consuming and expensive because of the batchwise operation and because only a single strand could be produced at a time. A proposal was made in German Published Application OS No. 2,540,613 according to which a pair of cooperating rotating rollers were used one of which has in its circumference a set of circumferentially continuous grooves whereas the other has a smooth surface and presses the moldable confectionary substance into the grooves to form strands. Problems occur with this construction in the filling of the grooves with the confectionary substance and subsequently in the release of the strands from the grooves, because the confectionary substance was not pressed sufficiently into the grooves and residues of the substance formed next to the groove which were very difficult to remove. The product strands were irregular and of non-uniform density, leading to fluctuations in the weight of the final articles into which the strands were subdivided and to an aesthetically displeasing appearance of the finished products.

SUMMARY OF THE INVENTION

Accordingly, it is an object of the present invention to avoid the disadvantages of the prior art.

A more particular object of the invention is to provide an improved apparatus for forming strands from moldable confectionary substance, which apparatus does not possess the prior-art disadvantages.

A still more specific object is to provide an apparatus of the type in question which permits the continuous production of cleanly molded product strands which can be readily further processed and which have uniform density over their entire length.

In keeping with these objects, and with others which will become apparent hereafter, one feature of the invention resides, in an apparatus of the type under discussion, in a combination which comprises a pair of cooperating axially parallel rollers each having a circumferential surface provided with axially alternating circumferentially complete grooves and ridges, the ridges of each roller being dimensioned to sealingly cooperate with the grooves of the other roller. Means are provided for supplying a flow of moldable confectionary substance to the nip between the rollers so as to be formed into strands into the respective grooves.

The means for supplying may comprise a receptacle accommodating the confectionary substance in flowable condition, and guide rollers arranged below the receptacle and which intercept the confectionery substance issuing from the receptacle and form it into a ribbon or web of material which is then supplied to the molding rollers. However, it goes without saying that other ways of supplying the material are also suitable.

The grooves of the one molding roller have a width corresponding to the width of the ribs of the cooperating molding roller, and the lateral flanking faces of the grooves and cooperating ribs constitute shear surfaces which subdivide the ribbon of confectionary substance into individual strands. The ribbon of material which has a width corresponding to the axial length of the two molding rollers, is thus subdivided into a plurality of laterally adjacent strands which advance separately from one another to the next-following operating station.

The ribs of each roller which enter into the cooperating grooves of the respective other roller press the confectionary substance into the respective groove, compacted and form a cleanly molded cross-sectional profile. It is immaterial which of the strands are used for further processing, i.e. the strands formed in the grooves of one of the roller, the strands formed in the grooves of the other of the rollers or the strands formed in the grooves of both of the rollers. However, it has been found to be particularly advantageous if only the strands issuing from the grooves of one of the rollers are further processed whereas the strands issuing from the grooves of the other roller are recirculated to the confectionary substance supply means. The second roller then operates as a pressure roller and only the first roller, i.e. the one whose strands are being used, operates as the actual molding roller.

According to a further concept of the invention, the two rollers are preferably of materials which are different with respect to their thermoconductivity. The form roller may for example be of metal—preferably of steel—in order to be able to carry off the heat of the confectionary substance more rapidly and to thus produce more form-retaining strands, whereas the roller which is to act only as a pressure roller may be of synthetic plastic material for example polytetrafluoroethylene which has lower thermoconductivity so as to retain the heat of the confectionary substance and thus make the substance in the grooves of this second roller remain readily moldable for the purpose not only of molding but also of more ready removal from the grooves. For the same reason it is also advantageous if the second roller has a smaller diameter than the actual molding roller. Both of the rollers, or either one of them, may be provided with passages for circulation of a heating or cooling fluid therethrough, depending upon the desirability of heating or cooling (or both) the confectionary substance. To be able to vary the thickness of the strands it is advantageous if the nip between the two rollers is adjustable.

The invention will hereafter be described with reference to embodiments of the invention illustrated in the drawing. However, it is to be understood that this is purely exemplary and that it is not to be considered as having any limiting effect on the appended claims.

DESCRIPTION OF PREFERRED EMBODIMENTS

Figure 1:
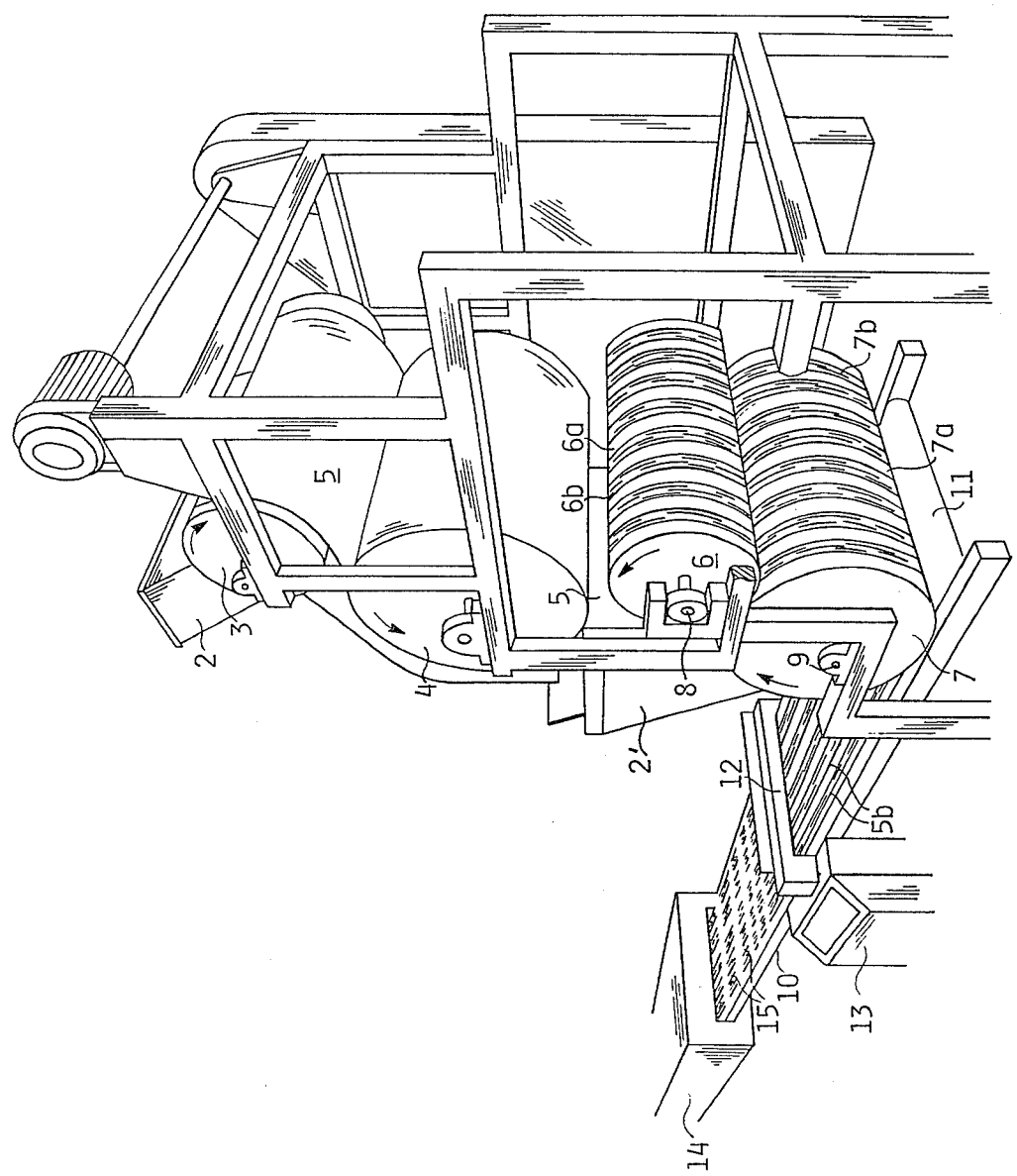
FIG. 1 is a somewhat diagrammatic perspective view of an apparatus according to the present invention.
Figure 2:
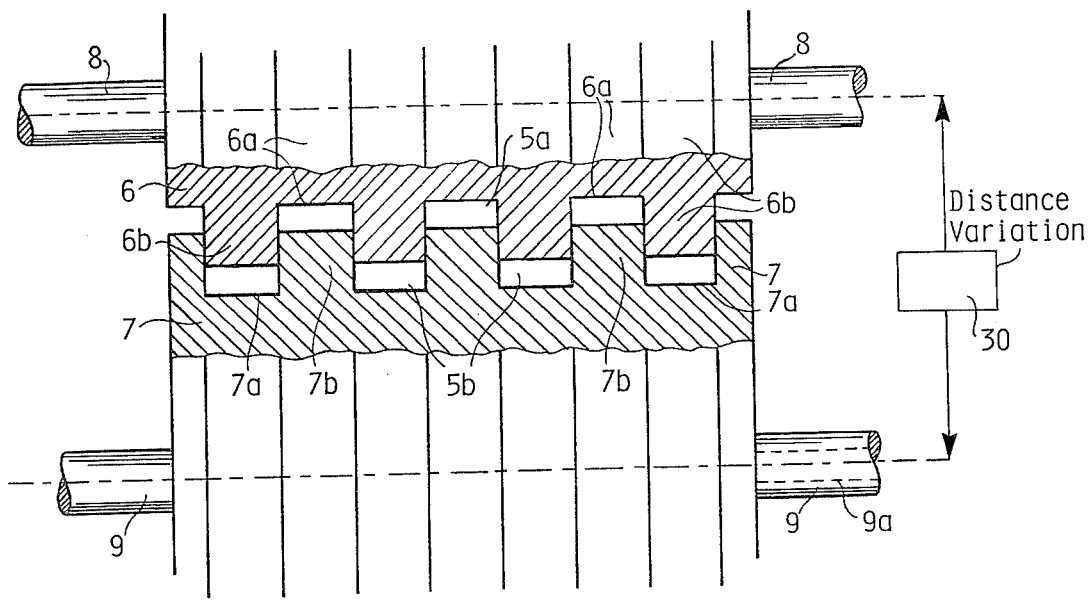
FIG. 2 is a fragmentary section through the area where the two rollers of FIG. 1 interengage with one another.

Reference numeral 1 in the drawing identifies a machine frame in which receptacles 2 and 2' are mounted from where the moldable confectionary substance in flowable form is to be supplied. Also mounted in the frame 1 are rollers 3 and 4 which receive the confectionary substance from the receptacles and spread it out to form a ribbon or web 5 having a width corresponding to the entire axial length of the rollers and which is then supplied to the nip between the two rollers 6 and 7. These two cooperating rollers 6 and 7 are driven (in a manner known per se and not illustrated) in the direction of the indicated arrows and are mounted on parallel shafts 8 and 9 the spacing of which is adjustable.

The two rollers 6 and 7 are eached provided on their circumferential surface with circumferentially complete grooves 6a and 7a, and between each two axially successive ones of the grooves 6a or 7a these same rollers are provided with circumferentially complete projecting ribs 6b and 7b, respectively. Each of the ribs 6b or 7b extends into one of the grooves 6a or 7a of the respectively opposite roller. Depending upon the size of the spacing X between the axes of rotation of the two shafts 8 and 9, the web or ribbon 5 of moldable confectionary substance is subdivided into product strands 5a or 5b of a thickness which depends, as just mentioned, upon the spacing X. The lateral flanking faces of the grooves 6a, 7a and of the cooperating ribs 6b, 7b constitute sheer faces which shear or subdivide the ribbon 5 into closely laterally adjacent product strands 5a and 5b. The substance in the respective grooves 6a, 7a, is compacted to a certain extent, so that the grooves are filled well and uniformly and cleanly molded strand profiles are obtained.

It is important that during unmolding from the grooves the mass or substance will become rigidified to a certain degree and consolidate so that the strands 5a and 5b can be removed from the grooves 6a, 7a by means of doctor blades 16, 17 or the like which enter into the grooves 6a and 7a. After unmolding the product strands can then be guided to conveyor belts 11 or other endless belts 18, respectively, 19 without losing their shape. To prevent a loss in shape of the product strands, for this purpose, the rollers may be tempered as for example, they may be cooled by circulating an appropriate heat exchange fluid through passages 9a in the rollers, for example.

Both the product strands 5a and 5b produced in the two rollers 6 and 7 may be further processed, e.g. subdivided. However, it is also possible—and currently preferred—to use only the product strands of one of the rollers whereas the strands of the other roller are recirculated to the supply receptacles or other supply means.

Figure 3:
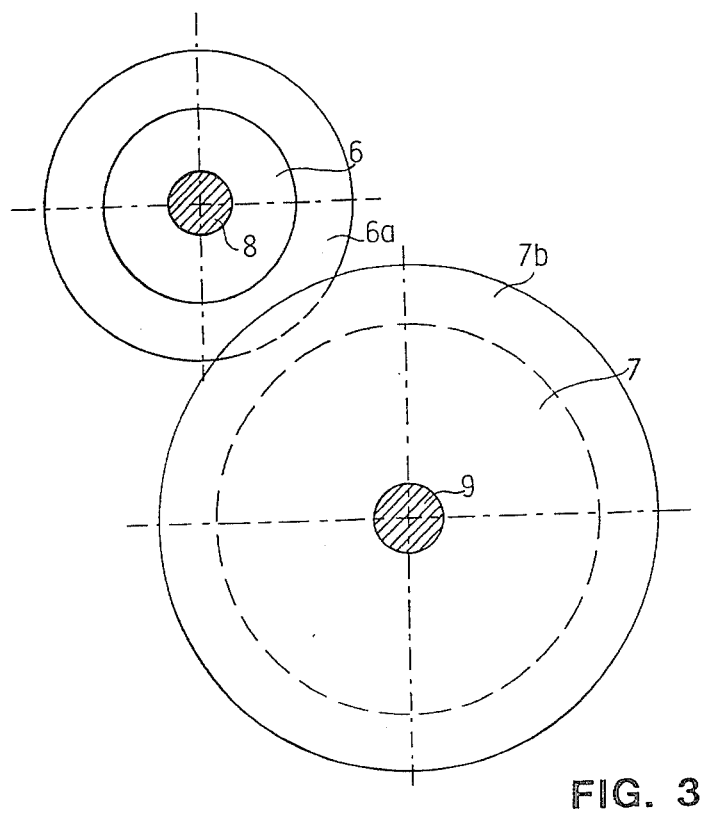
FIG. 3 is an end view of the rollers in FIGS. 1 and 2.
Figure 4:
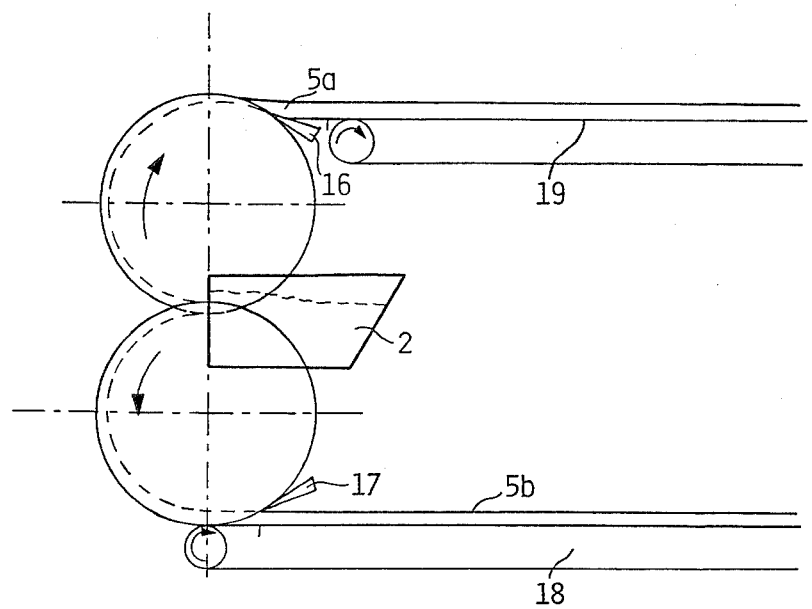
FIG. 4 is a diagrammatic illustration showing one embodiment for guiding of the strands.
Figure 5:
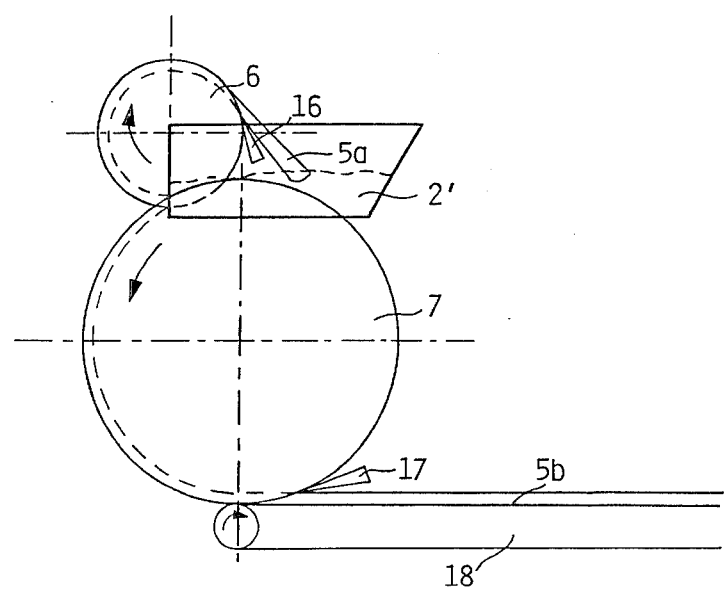
FIG. 5 is a somewhat different embodiment of the guidance of the strands.

The first of these embodiments is diagrammatically illustrated in FIG. 4 and the second embodiment is illustrated in FIG. 5 and also in FIG. 1. In the second embodiment the roller 7 has, as FIGS. 1, 3 and 5 illustrate, a diameter which is substantially larger than the cooperating roller 6; the purpose is to facilitate cooling of the strands 5b by making them traverse a larger path in the grooves of the roller 7. In addition, the roller 7 is preferably made of steel and the roller 6 of synthetic plastic material, particularly polytetrafluoroethylene, since steel more readily carries off the heat of the substance whereas the synthetic plastic material has a lesser coefficient of thermoconductivity and thus maintains the substance at higher temperature and retains it closer to liquid which makes it easier to remove the substance from the grooves 6a of the roller 6 and to return the substance via the doctor blades 16 to the receptacle 2'. The strands 5b which are more severely cooled on the roller 7 and thus more coherent and shape retaining, are removed from the roller 7 by means of the doctor blades 17 and deposited upon a conveyor belt 11 which travels over a table 10. They (the strands) then travel through a cutter 12, 13 (see FIG. 1) which subdivides them longitudinally into individual small pieces 15.

These can then be further hardened in a cooling channel 14 and advanced to a subsequent working station, e.g. to be coated with an appropriate substance.

It will be understood that the invention is not limited to the embodiments illustrated. The rollers 6, 7 may for example be composed of a series of axially adjacent disks, rings which can be mounted on the respective shaft and be provided with elements influencing the profile of the product strands. The rollers 6, 7 may also be mounted immediately following a supply receptacle and they may be driven at different speeds, in dependence upon the requirements of a particular application. The distance between rollers 6, 7 can be varied by a conventional device 30, for example.

The invention has hereinbefore been illustrated with respect to exemplary embodiments. However, it is to be understood that all such changes and modifications as will offer themselves to those of ordinary skill in the art are intended to be encompassed within the scope and intent of the appended claims.

What I claim is:

1. Apparatus for forming strands from moldable confectionary substance, comprising: a pair of cooperating axially parallel rollers, each roller having a circumferential surface provided with grooves running around the circumferential surface, said grooves having bordering sides forming shearing surfaces parallel to each other and perpendicular to the axis of each roller, portions remaining between grooves on one roller meshing in close contact tightly in the grooves of the other roller for subdividing the confectionary substance into individual product strands, said portions and grooves of one roller cooperating sealingly with respectively the grooves and portions of the other roller; and supply means for supplying a web of moldable confectionary substance to the nip between said rollers so as to be formed into strands, said shearing surfaces forming said strands without applying pressure to said strands and web, said web and said strands remaining undeformed and uncompressed during passage between said rollers by being free of pressure applied thereto, said strands being formed with intervals between them, said strands being separated by removing each strand on a level differing from the level whereon the neighboring strand is removed, one of said rollers comprising a form roller with diameter larger than the diameter of the other roller, said other roller meshing with its portions tightly into the grooves of said form roller.

2. The apparatus of claim 1, wherein portions of one of said rollers are dimensioned to partially enter into the grooves of the other roller, cooperating lateral flanking faces of said grooves and portions acting as shear faces for subdividing said web of confectionary substance into strands.

3. The apparatus of claim 1, at least one of said rollers having internal passages for circulation of a heat exchange fluid therethrough.

4. The apparatus of claim 3, wherein one of said rollers is made of a material having a coefficient of thermoconductivity which is different from the material of the other of said rollers.

5. The apparatus of claim 4, wherein one of said rollers is a molding roller of metal, and the other roller is a counter roller of synthetic plastic material.

6. The apparatus of claim 5, wherein said metal is steel.

7. The apparatus of claim 5, said other roller comprising means for returning confectionary substance entering its grooves to said supply means.

8. The apparatus of claim 1, each of said rollers having a shaft defining an axis of rotation; and further comprising means for varying the distance between said axes of rotation.

9. The apparatus of claim 2, said ribs having radially outwardly extending circumferentially spaced projections for longitudinally subdividing said strands into individual pieces.

10. The apparatus of claim 2, wherein the cross-section of at least some of said portions and grooves differs in axial direction of said rollers.

11. The apparatus of claim 10, wherein said at least some grooves and portions differ from one another in at least one of their widths, depths and cross-sectional shape.

12. The apparatus of claim 1, wherein at least one of said rollers is composed of axially adjacent discrete circular-outline elements.

13. The apparatus of claim 12, wherein said elements are disks.

14. The apparatus of claim 12, wherein said elements are rings.

15. The apparatus of claim 1, at least one of said rollers having internal passages for circulation of a heat exchange fluid therethrough, one of said rollers being made of a material having a coefficient of thermal conductivity which is different from the material of the other of said rollers, one of said rollers being a molding roller of metal, and the other roller being a counter roller of synthetic plastic material, said metal being steel, said other roller having a smaller diameter than said one roller, said other roller comprising means for returning confectionary substance entering its grooves to said storage supply means, each of said rollers having a shaft defining an axis of rotation, means for varying the distance between said axes of rotation, said portions having radially outwardly extending circumferentially spaced projections for longitudinally subdividing said strands into individual pieces, the cross-section of at least some of said portions and grooves differing in axial direction of said rollers, said at least some grooves and portions differing from one another in at least one of their widths, depths and cross-sectional shape, at least one of said rollers being comprised of axially adjacent discrete circular-outline elements.

* * * * *